(12) United States Patent  (10) Patent No.: US 8,421,280 B2
Lopatinsky                  (45) Date of Patent:     Apr. 16, 2013

(54) ELECTROMAGNETIC MOVING SYSTEM

(75) Inventor: Edward Lopatinsky, San Diego, CA (US)

(73) Assignee: Industrial Design Laboratories Inc

( * ) Notice: Subject to any disclaimer, the term of this patent is extended or adjusted under 35 U.S.C. 154(b) by 444 days.

(21) Appl. No.: 12/586,179

(22) Filed: Sep. 19, 2009

(65) Prior Publication Data
US 2010/0090546 A1    Apr. 15, 2010

Related U.S. Application Data

(60) Provisional application No. 61/195,717, filed on Oct. 10, 2008.

(51) Int. Cl.
*H02K 41/03* (2006.01)

(52) U.S. Cl.
USPC ..................... 310/12.25; 310/12.21

(58) Field of Classification Search ........... 310/12.21, 310/12.22, 12.24, 12.25, 12.26, 12.01, 12.09, 310/12.11, 12.12, 13; *H02K 41/03*
See application file for complete search history.

(56) References Cited

U.S. PATENT DOCUMENTS

| 5,072,144 | A  | * | 12/1991 | Saito et al. | 310/12.28 |
| 6,252,316 | B1 | * | 6/2001  | Fujie | 310/12.09 |
| 2007/0283841 | A1 | * | 12/2007 | Lopatinsky et al. | 104/284 |
| 2008/0238218 | A1 | * | 10/2008 | Lopatinsky et al. | 310/12 |

* cited by examiner

*Primary Examiner* — Tran Nguyen
*Assistant Examiner* — Naishadh Desai

(57) ABSTRACT

An electromagnetic moving system comprises a stator, at least one moving body and at least one controller. The stator comprised of electrically connected flat coil windings spaced apart in a series way and forming a three phase stator. Each of the coil windings has a magnetic axis substantially perpendicular to the coil winding. The moving body comprises 4 permanent magnets placed in pairs. Each pair of magnets includes two alternatively pointed and spaced apart magnets. The magnetic axes of the permanent magnets substantially parallel to the magnetic axes of the coil windings such as to cause interaction with the stator when it is powered, thus creating a force tending to propel the body along the line connected the center points of the coil windings.

3 Claims, 2 Drawing Sheets

ELECTROMAGNETIC MOVING SYSTEM

The present application claims the benefit of priority of U.S. Provisional Patent Application No. 61/195,717, filed Oct. 10, 2008 filed for Edward Lopatinsky the entire context of which is incorporated herein by reference.

FIELD OF THE INVENTION

The present invention relates generally to electromagnetic systems for moving mechanical bodies along predefined tracks. More particularly, the present invention relates to toy and/or entertainment systems, and all subsystems in which is useful to controllably move an object upon a surface. The present invention is particularly, but not exclusively, useful for systems that relates to miniature motion devices like train or vehicles.

BACKGROUND OF THE INVENTION

There are numerous designs of electromagnetic moving systems like miniature toy railway systems that include a track and at least one vehicle located on said track.

There are known systems of this type, for example, U.S. Pat. No. 4,861,306 "Toy CoL, Railway" and U.S. Pat. No. 6,648,724 "Toy Railway Liquid Transfer Facility", that include the track (platform, chassis) driven by an engine and vehicle mounted on said track.

Another type of system, for example. U.S. Pat. No. 3,729,866 "Toy Railway Vehicle and Switching Section", comprises battery powered vehicle with electric motor.

The most widely known electromagnetic moving system in the toy industry is applied to miniature toy railway systems include a track comprising at least two conductive bands that are connected to an electrical supply which gives a power to the electric motor of said vehicle, —see, for example, U.S. Pat. No. 4,217,727 "Miniature Monorail System".

There is also known the design of electromagnetic moving system comprises a toy with a permanent magnet and a track carrying a plurality of electrical windings arranged in a row as it discloses by the GB Patent 979,985 "Electrically Propelled Toys".

The main problem of all such known systems is that it is difficult to provide reliable speedy motion to such vehicles because of the lack of stable attraction between the vehicle and track, especially at higher speed on turns, also with vertical or nearly vertical sections as a vertical ring or spiral. Even when track sections are located horizontally the vehicle moving at high speed can lose stability and move from the track. So, known electromagnetic moving systems must include some special means to provide reliable attraction between the driven vehicle and the track. In some cases it is done by using magnets on the bottom of the vehicle and making the track from magnetic conductive (attractive) material. But these means in known systems also add resistance to motion, or drag, to the moving vehicle and need much more power to achieve motion. Most such toys have special brushes that provide electrical contact with the electric grid. Or they might use batteries that do not require brushes, in which case they operate uncontrolled, or achieve control through the wires. or via a wireless radio or infra-red connection, but in such cases have limited operating time due to battery life.

The problems mentioned above were overcome according to the published Patent Application PCT/US 07/02917 "Electromagnetic Moving System" filed Feb. 6, 2007 by the same assignee. According to this design the electromagnetic moving system comprises of at least one track with a contact surface, at least one moving body located on the contact surface and at least one controller. The moving body comprises two permanent magnets of opposite polarities. But this invention does not provide enough attraction between the moving body and the track especially when the track oriented incline or vertically.

Therefore, it would be generally desirable to provide an electromagnetic moving system that offers further improvements to the above mentioned invention.

SUMMARY OF THE INVENTION

According to the present invention an electromagnetic moving system comprises a stator, at least one moving body and at least one controller. The stator comprises of electrically connected flat coil with adjacent windings spaced apart by step in a series way and forming a three-phase stator.

The general idea of the claimed invention is that the moving body (train car, vehicle) comprises four permanent magnets located in pairs thus two magnets of every said pair spaced apart from the second pair of magnets at the distance named above step multiplied by at least number of 3. Also, each above mentioned pair of said magnets comprises two alternatively pointed and spaced apart magnets at the distance of 1.5 named above steps of any adjacent coil windings.

In order to achieve these objectives, according to the first embodiment of the present invention, stator comprises of electrically connected flat coil with adjacent windings spaced apart by distance naming step in a series way and forming a three-phase stator. The moving body (train car, vehicle) comprises four permanent magnets located in pairs thus two magnets of every said pair of magnets spaced apart from the second pair of magnets at the 3 distances of named step. Also, each above mentioned pair of magnets comprises two alternatively pointed and spaced apart magnets at the 1.5 of distance between any adjacent coil windings. All coils windings have magnetic axis perpendicular to the flat coils. The magnetic axes of the permanent magnets substantially parallel to the magnetic axes of the coil windings such as to cause interaction with the stator when it is powered, thus creating a force tending to propel the moving body along the line connected the center points of the coil windings. Flat coil windings are incorporated with a track with a contact surface. The moving body located on the contact surface, thus the system operates as a linear electric motor.

According to the present invention, first pair of magnets could be spaced apart from the second pair of magnets at the step distance multiplied by any number greater than 3. However this number should be divisible by 1.5.

According to the present invention the coils windings may be made as at least a one layer printed circuit board and the controller may be made as a sensorless controller, without feedback.

The moving body may be made of none ferrous material, such as plastic and the permanent magnets substantially flush-mounted with said material from the side adjacent to the contact surface.

The foregoing and other objectives, features and advantages of the invention will be more readily understood upon consideration of the following detailed description of the invention, taken in conjunction with the accompanying drawings.

DETAILED DESCRIPTION OF THE INVENTION

The present invention will be described in detail below with reference to the accompanying drawings.

Figure 1:
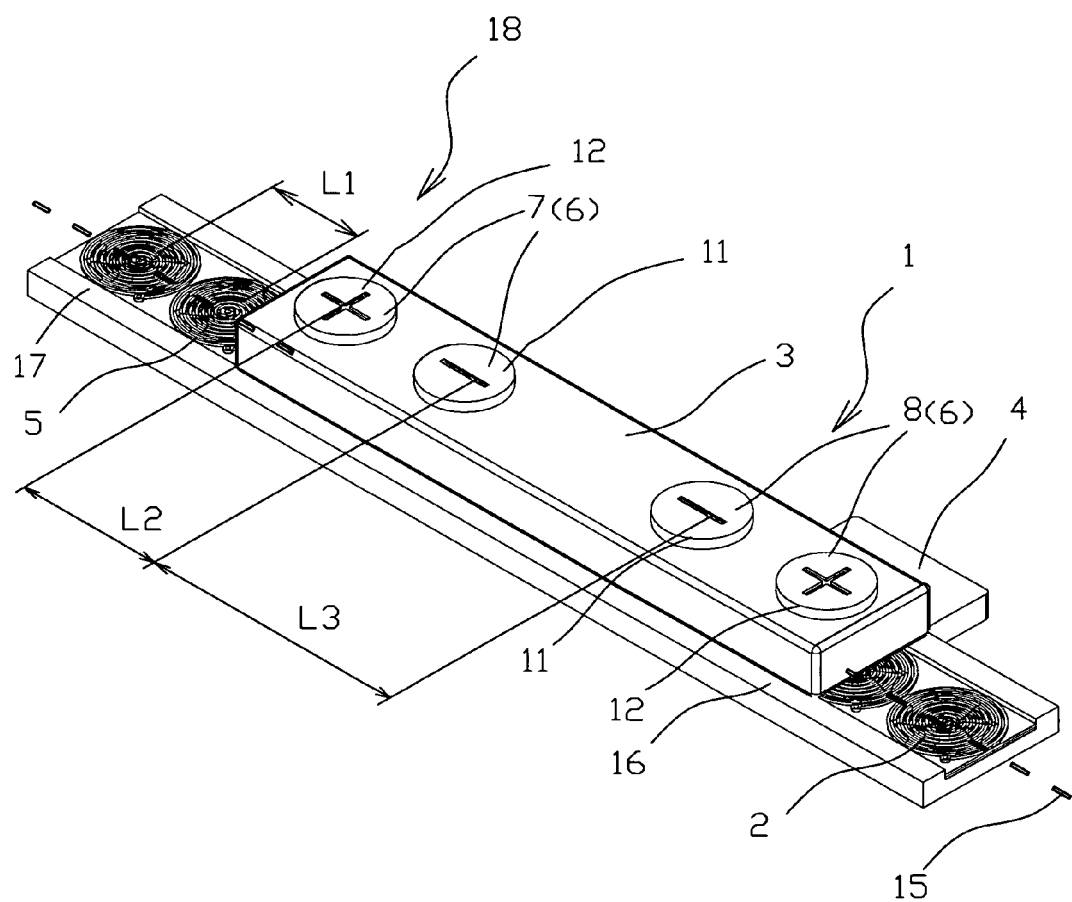
FIG. 1 is a perspective view showing the first embodiment of the present invention placed on the fiat coils track.
Figure 2:
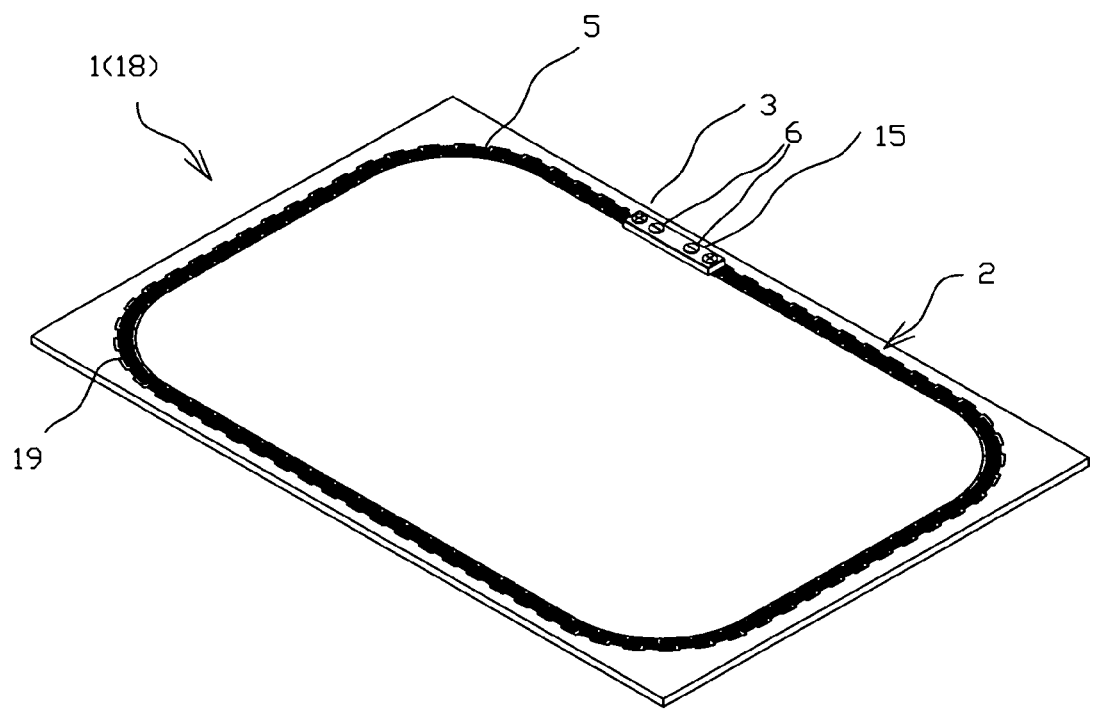
FIG. 2 is a perspective view showing the first embodiment of the present invention when the moving body placed on the oval PC board track.

FIGS. 1, 2 show the present invention.

The electromagnetic moving system 1 according to the preferred embodiment (FIG. 1) comprises a stator 2, at least one moving body 3 and at least one controller 4. The stator 2 comprises of electrically connected flat coil windings 5 spaced apart at the step L1 in a series way and forming a three-phase stator. Each of the coil windings 5 has a magnetic axis substantially perpendicular to the stator 2. The moving body 3 comprises four permanent magnets 6 placed in two pairs 7 and 8.

The distance between pairs 7 and 8 (L3) equal to the number 3 multiplied by 1.5 of step (L1). The both pairs of magnets 7 and 8 comprises two spaced apart magnets at 1.5 (L2) of distance between the adjacent winding coils 5 alternatively pointed magnets 11 and 12. The second embodiment differs from the first that distance between pairs of magnets 7 and 8 (L3) greater than number 3 multiplied by 1.5 of step (Li). The magnetic axes of the permanent magnets 6 substantially parallel to the magnetic axes of the coil windings 5 such as to cause interaction with the stator 2 when it is powered, thus creating a force tending to propel the moving body 3 along the line 15 connected the center points of the coil windings 5. The flat coil windings 5 are incorporated with a track 16 with a contact surface 17. The moving body 3 located on the contact surface 17, thus the system 1 operates as a linear electric motor 18 (FIG. 2).

According to the present invention the coils windings 5 may be made as at least a one layer printed circuit board 19 and the controller 4 may be made as a sensorless controller, without feedback (FIG. 2).

For all embodiments the stator 2 is made as a three phase stator.

The moving body 3 may be made of none ferrous material and the permanent magnets 6 substantially flush-mounted with said material from the side adjacent to the contact surface 17. Said non ferrous material can be plastic.

The electromagnetic moving system 1 operates in the following ways. When electrical power is supplied from the power source (not shown) to the coils windings 5 of the track 16 operate together as the stator 2 and alternating electromagnetic fields are created.

At first step, the electrical power is supplied to two adjacent coils windings 5 of the stator 2 located on a part of the track 16 where the moving body 3 is located at this moment. The electromagnetic field created by every two adjacent coils windings 5 interacts with a magnetic field created by the every pair of permanent magnets 7 and 8 of the moving body 3. As a result, the moving body 3 is propelled along the track 16 to the next segment of coils 5 of the track 16 with two adjacent coils windings 5, where the polarity of electrical power is switched by the controller 4, further propelling the moving body 3, thus the moving body 3 continues to move to subsequent coils windings 5, and so on.

The main effect of the present invention that makes it much better than all known technical solutions in this field is as following: electromagnetic interaction between the coils windings 5 of the track 16 and the moving body 3 provides reliable attraction between both ends of the moving body 3 and the track 16 in any possible configuration and location of the track 16 and the moving body 3 and a stable movement without any special means for it. It makes the electromagnetic moving system 1 much more reliable and gives the possibility to operate at the higher speed of the moving body 3 and in any position of it; thus providing the possibility to make the part of the track 16 as a vertical ring or a spiral or in any other configuration. It also makes the electromagnetic moving system 1 easily controlled electronically (weight, speed, acceleration, turns, and etc.).

I claim:

1. An electromagnetic moving system comprises a stator, at least one moving body and at least one controller, wherein:
   (i) said stator comprises of electrically connected flat coils with adjacent windings spaced apart by step in a series way and forming a three-phase stator,
   (ii) each of said coil with adjacent windings has a magnetic axis substantially perpendicular to a coil winding;
   (iii) said body comprises four permanent magnets located in pairs thus two magnets of every said pair spaced apart from the second pair of magnets at a step distance multiplied by at least number of 3;
   (iv) each pair of said magnets comprises two alternatively pointed and spaced apart magnets at the distance substantially of 1.5 steps of said adjacent coil windings such as to cause interaction with said stator when it is powered, thus creating a force tending to propel said body along the line connecting the center points of said coil windings.

2. The system as claimed in claim 1, wherein said two magnets of first pair spaced apart from the second pair of magnets at the said step distance multiplied by number greater than 3 and divisible by 1.5.

3. The system as claimed in claim 1, wherein said flat coil with adjacent windings are made as at least a one layer of printed circuit board.

* * * * *